United States Patent
Lequippe et al.

(10) Patent No.: US 11,465,934 B2
(45) Date of Patent: Oct. 11, 2022

(54) PROCESS FOR OBTAINING A TEXTURED GLASS SUBSTRATE COATED WITH AN ANTIREFLECTIVE COATING OF SOL-GEL TYPE

(71) Applicant: SAINT-GOBAIN GLASS FRANCE, Courbevoie (FR)

(72) Inventors: Guillaume Lequippe, Compiegne (FR); Xiaolin Pardal, Compiegne (FR); Servane Haller, Lyons (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 137 days.

(21) Appl. No.: 16/629,149

(22) PCT Filed: Jul. 5, 2018

(86) PCT No.: PCT/FR2018/051685
§ 371 (c)(1),
(2) Date: Jan. 7, 2020

(87) PCT Pub. No.: WO2019/008282
PCT Pub. Date: Jan. 10, 2019

(65) Prior Publication Data
US 2020/0131082 A1  Apr. 30, 2020

(30) Foreign Application Priority Data
Jul. 7, 2017 (FR) .................................. 1770729

(51) Int. Cl.
| | |
|---|---|
| B05D 5/02 | (2006.01) |
| C03C 17/25 | (2006.01) |
| A01G 9/14 | (2006.01) |
| G02B 1/113 | (2015.01) |
| C03C 17/23 | (2006.01) |
| B05D 3/02 | (2006.01) |
| B05D 3/04 | (2006.01) |
| G02B 1/11 | (2015.01) |

(52) U.S. Cl.
CPC .............. *C03C 17/25* (2013.01); *A01G 9/14* (2013.01); *B05D 3/0227* (2013.01); *B05D 3/0413* (2013.01); *B05D 5/02* (2013.01); *C03C 17/23* (2013.01); *G02B 1/11* (2013.01); *G02B 1/113* (2013.01); *C03C 2217/213* (2013.01); *C03C 2217/425* (2013.01); *C03C 2217/732* (2013.01); *C03C 2218/113* (2013.01)

(58) Field of Classification Search
None
See application file for complete search history.

(56) References Cited

U.S. PATENT DOCUMENTS

| | | | | |
|---|---|---|---|---|
| 3,635,751 | A * | 1/1972 | Long, III | ............ C03C 17/3411 220/2.1 A |
| 4,560,581 | A * | 12/1985 | Deal | ........................ H01J 9/20 427/165 |
| 4,596,745 | A * | 6/1986 | Chao | ...................... C03C 17/25 427/165 |
| 4,694,218 | A | 9/1987 | Chao | |
| 4,965,096 | A * | 10/1990 | Deal | ...................... C03C 17/25 427/165 |
| 9,242,893 | B2 * | 1/2016 | Oudard | ............. H01L 31/02168 |
| 9,382,449 | B2 * | 7/2016 | Maghsoodi | ............. G02B 1/111 |
| 9,441,119 | B2 * | 9/2016 | Kalyankar | ............... C03C 1/008 |
| 9,707,592 | B2 * | 7/2017 | Lu | ............................ B05D 1/02 |
| 2004/0028918 | A1 * | 2/2004 | Becker | .................. C03C 17/007 65/60.5 |
| 2010/0209673 | A1 * | 8/2010 | Viasnoff | .................. B44C 1/227 428/172 |
| 2012/0141770 | A1 * | 6/2012 | Cadet | ....................... G02B 1/18 428/312.6 |
| 2013/0095237 | A1 * | 4/2013 | Kalyankar | ............. G02B 1/115 427/161 |
| 2013/0163087 | A1 * | 6/2013 | Lecolley | ............... C03C 17/007 359/601 |
| 2014/0272125 | A1 * | 9/2014 | Liang | .................... C03C 17/007 427/161 |
| 2016/0041307 | A1 * | 2/2016 | Lu | .......................... G02B 5/021 428/414 |
| 2016/0282522 | A1 * | 9/2016 | Schiavoni | ......... B32B 17/10788 |

FOREIGN PATENT DOCUMENTS

| | | |
|---|---|---|
| FR | 2 908 406 A1 | 5/2008 |
| WO | WO 2011/018590 A1 | 2/2011 |

OTHER PUBLICATIONS

Technical data sheet for poly(ethylene glycol) having an average molecular weight of 8,000, 7 pges, 2022. (Year: 2022).*
International Search Report as issued in International Patent Application No. PCT/FR2018/051685, dated Jan. 7, 2019.

* cited by examiner

*Primary Examiner* — Robert S Loewe
(74) *Attorney, Agent, or Firm* — Pillsbury Winthrop Shaw Pittman LLP

(57) ABSTRACT

A process for obtaining a material including a textured glass substrate coated, on at least one of its textured faces, with an antireflective coating of sol-gel type based on porous silica, includes a stage of application, to the at least one textured face of the substrate, of a solution containing at least one silica precursor and at least one pore-forming agent, then a heat treatment stage targeted at consolidating the antireflective coating. Before the application stage, the glass substrate is subjected to a preheating stage, so that the at least one textured face intended to be coated with the antireflective coating has a temperature within a range extending from 30° C. to 100° C. immediately before the application stage.

20 Claims, No Drawings

PROCESS FOR OBTAINING A TEXTURED GLASS SUBSTRATE COATED WITH AN ANTIREFLECTIVE COATING OF SOL-GEL TYPE

CROSS-REFERENCE TO RELATED APPLICATIONS

This application is the U.S. National Stage of PCT/FR2018/051685, filed Jul. 5, 2018, which in turn claims priority to French patent application number 1770729 filed Jul. 7, 2017. The content of these applications are incorporated herein by reference in their entireties.

The invention relates to the field of materials comprising a glass substrate coated with at least one antireflective coating. It relates in particular to materials which can be used as roofing for agricultural, horticultural or urban greenhouses.

The glass materials intended to be employed as panes for greenhouses have to meet certain requirements in terms of optical properties and of durability. Their light transmittance has in particular to be as high as possible and it is known, in order to do this, to employ extra-clear glass substrates and to coat these substrates with antireflective layers based on porous silica which are obtained by processes of sol-gel type. Due to their low refractive index, ideally close to the square root of the refractive index of the glass substrate, and to their high chemical durability, these layers have proved to be particularly appropriate. Such layers are described in particular in Application FR 2 908 406.

It turns out that the yields of the crops placed under the greenhouses are also improved by the use of substrates capable of scattering light. This is because scattered and homogeneous lighting optimizes the growth of the plants. In order to do this, glass substrates exhibiting at least one textured face have been developed. Such substrates are, for example, obtained by rolling the glass, that is to say by causing the hot glass to pass between rolls, themselves textured, which imprint the surface of the glass and create a relief. The term "figured rolled glass" is also employed in the art.

However, it turned out that the deposition of sol-gel antireflective layers of the type described above by application of a solution to a textured surface does not make it possible to obtain perfectly optimized optical properties, in particular for the largest texturings. The inventors have been able to demonstrate that, even if the solution was deposited homogeneously over the entire surface of the glass, the texturing of the latter induced, during the drying, capillary forces promoting a flow into the valleys of the textured structure, resulting, after drying, in a layer heterogeneous in thickness, in which the layer has a very low thickness, indeed even is non-existent, at the peaks of the structure. This results in a spatial heterogeneity of the light reflection factor and consequently in an overall light transmittance factor which is lower than if the layer were perfectly homogeneous.

The invention, the aim of which is to overcome these disadvantages, has as subject matter a process for obtaining a material comprising a textured glass substrate coated, on at least one of its textured faces, with an antireflective coating of sol-gel type based on porous silica, said process comprising the following stages:

a stage of application, to said at least one textured face of said substrate, of a solution containing at least one silica precursor and at least one pore-forming agent, then a heat treatment stage targeted at consolidating said antireflective coating, said process being such that, before said application stage, the glass substrate is subjected to a preheating stage, so that said at least one textured face intended to be coated with said antireflective coating has a temperature within a range extending from 30° C. to 100° C. immediately before the application stage.

The glass substrate is generally provided in the form of sheets, generally rectangular sheets, with a thickness within a range extending from 1 to 10 mm, in particular from 2 to 8 mm, indeed even from 3 to 6 mm. The lateral dimensions of the sheets typically range from 0.5 to 3 m.

The glass substrate preferably consists of a glass of soda-lime-silica type. However, other types of glass can be used, such as borosilicate or aluminosilicate glasses. The glass substrate is preferably an extra-clear glass, in the sense that the total content by weight of iron oxide is within a range extending from 10 to 200 ppm, in particular from 20 to 150 ppm. The light transmittance factor within the meaning of Standard EN 410 of the glass substrate is advantageously at least 90%, indeed even 91%.

"Textured face" is understood to mean that the face in question exhibits a relief, composed of a succession of peaks and valleys. This relief can be periodical or random.

At least one textured face of the substrate intended to be coated with the antireflective coating preferably exhibits a profile such that, within the meaning of Standard ISO 4287:1997:

the parameter Rz is within a range extending from 18 to 200 µm, in particular from 20 to 150 µm and especially from 50 to 120 µm, and the parameter RSm is within a range extending from 500 to 2500 µm, in particular from 600 to 2000 µm.

These values are obtained using 25-µm $\lambda$s and 8-mm $\lambda$c filters.

The texturing is capable of creating a haze and thus of scattering light. The glass substrate advantageously exhibits a haze of at least 20%, in particular 40% and even 50% or 70%, indeed even 80%. As a general rule, a higher value of the parameter Rz is associated with a higher haze. The haze is measured according to Standard ISO 14782: 1999.

The glass substrate can have just one textured face or else two textured faces.

The textured glass substrate is preferably obtained by rolling the glass. This technique consists, at the outlet of the melting furnace, during the shaping of the glass, in passing the hot glass between two rolls, generally metal rolls, one at least of which is textured, that is to say exhibits a relief. The hot glass is then imprinted by the textured roll, the relief thus created being preserved during the cooling of the glass.

Other texturing methods are possible, such as chemical or mechanical attacks: attack with acid, in particular hydrofluoric acid, or sandblasting, by projecting abrasive particles onto the surface of the glass. However, these methods are more expensive and less environmentally friendly.

The coating is of the sol-gel type, that is to say is obtained by a sol-gel process.

A sol-gel process typically comprises:

the formation of a "sol", that is to say of a solution containing at least one precursor, in this instance silica,
the application of this solution to the surface to be coated,
the consolidation or densification of the coating by means of a heat treatment.

The solution preferably contains a solids content of at most 10%, in particular 5%, by weight, and generally of at least 1% by weight.

The solvent of the solution is preferably chosen from water, organic solvents, and mixtures of water and of organic solvent. The organic solvents are preferably chosen from alcohols (for example isopropanol, propanol, ethanol, and the like) and acetone. The term "solvent" is employed here in its generic sense, with the result that the solvent can consist of a mixture of solvents.

The solution is preferably aqueous, in the sense that the solvent of the solution contains at least 50% by weight of water, indeed even 60%, and even 70% or 80% or else 90% or 95%. The solvent is even preferably completely aqueous, in the sense that it consists of water. This is because the use of aqueous solutions or at the very least predominantly aqueous solutions exhibits advantages in terms of environment, of industrial hygiene and of cost but also of durability of the layer obtained. In addition, it turns out that the advantages related to the invention in terms of homogeneity in thickness become greater as the amount of water in the solvent increases.

The antireflective coating is based on silica. The silica content of the coating is preferably at least 60% by weight, in particular 70% and even 80% or 90% by weight. The coating advantageously consists of silica.

The silica precursor is preferably a compound chosen from silicon alkoxides and halides, for example tetraethyl orthosilicate (TEOS). The silica precursor can also be a product of chemical reactions which take place between these compounds and other constituents of the solution, for example water when the solvent contains water. This is because these compounds are capable of hydrolyzing, at least partially, during the formation of the solution, thus before the application.

The pore-forming agent is preferably solid, the choice of its size making it possible to vary the size of the pores. The pore-forming agent is preferably particulate, in particular of substantially spherical shape, for example in the form of hollow or solid beads. The pore-forming agent is preferably of organic nature. By way of example, the pore-forming agent comprises polymeric beads, especially of a polymer chosen from polymethyl methacrylate (PMMA), methyl (meth)acrylate/(meth)acrylic acid copolymers, polycarbonates, polyesters or polystyrene.

The solution to be applied is preferably acidic. Its pH is preferably between 0 and 5, in particular between 1 and 3.

In addition to the silica precursor and the pore-forming agent, the solution can comprise other components, such as pH-regulating agents, surfactants, and the like.

The solution is preferably applied by coating by means of at least one roll, which technique is also known as "roll coating", which makes it possible to precisely control the amount of solution deposited and also the spatial homogeneity of the deposition. According to this technique, the glass substrate is preferably progressed forward under a metering roll and an applicator roll in virtual contact with one another and in rotation in the same direction or in the opposite direction, the applicator roll being in contact with the face of the substrate to be coated, and the solution to be applied being poured via the top between these two rolls. The solution, passing between the metering roll and the applicator roll, is deposited at the surface of the latter and is then transferred to the face to be coated.

Other known application techniques can also be used, for example spraying, dipping, curtain, and the like, techniques.

Immediately after the application stage, before the heat treatment stage, the process according to the invention preferably comprises a drying stage. This stage is intended to accelerate the evaporation of the solvent contained in the coating. It can be carried out by any known means, for example by blowing of hot air. The temperature of the air is then preferably between 50° C. and 160° C. and the drying time is preferably between 5 and 60 seconds.

The heat treatment stage makes it possible to consolidate the antireflective coating. During this stage, the pore-forming agents are also removed, creating a porosity within the coating, thus making it possible to lower its refractive index.

The heat treatment preferably involves bringing the coating to a temperature of at least 400° C., in particular 500° C.

The heat treatment is preferably a tempering treatment of the glass. The tempering of the glass consists in reheating the glass to a temperature generally of greater than 600° C. and in then rapidly cooling it, generally by means of nozzles emitting cold air. This rapid cooling makes it possible to create compressive stresses at the surface of the glass substrate and to thus reinforce its mechanical strength and its impact strength.

The antireflective coating preferably comprises closed pores having a characteristic smaller dimension which is advantageously, on average, at least 20 nm, in particular 40 nm, indeed even 50 nm, and at most 1 µm, in particular 500 nm, indeed even 100 nm. The distribution of the pores is preferably substantially homogeneous in the thickness. The proportion by volume of the pores in the coating is preferably between 10% and 90%, in particular between 20% and 80%, indeed even between 30% and 70%.

The antireflective coating preferably exhibits a mean thickness within a range extending from 10 nm to 10 µm, in particular from 20 nm to 1 µm, indeed even from 30 to 300 nm or from 50 to 200 nm.

The antireflective coating advantageously exhibits a refractive index, for a wavelength of 600 nm, of at most 1.40, in particular 1.30.

The antireflective coating can be the only coating carried by the glass substrate. Alternatively, other coatings can be present on the same face or on another face of the substrate. In particular, it is advantageous to interpose, between the glass substrate and the antireflective coating, an underlayer containing silicon, oxygen and optionally nitrogen and/or carbon, such as a layer of silica, of silicon oxycarbide or of silicon oxynitride. Such an underlayer is in particular of use when the glass contains alkali metal ions as it is capable of forming a barrier to said ions. A non-porous silica underlayer, having a refractive index between 1.35 and 1.45, has also proved to be of use in increasing the light transmittance of the material. Such underlayers preferably exhibit a thickness within a range extending from 10 to 200 nm, in particular from 80 to 120 nm. They can be deposited by any type of process, for example of sol-gel, chemical vapor deposition (CVD), cathode sputtering, and the like, type.

Without the reason being known, it turned out that the preheating stage makes it possible to homogenize the thickness of the antireflective coating. This results in a gain in terms of hemispherical light transmittance of the material.

The preheating stage is carried out so that the at least one textured face intended to be coated with said antireflective coating has a temperature within a range extending from 30° C. to 100° C., in particular from 50° C. to 80° C., immediately before the application stage. "Immediately" is preferably understood to mean that the textured face to be coated exhibits a temperature within the abovementioned range at most 5 seconds, in particular 3 seconds, indeed even 1 second, before the start of the application of the solution.

The temperature of the face to be coated can be measured by any known means, for example by means of a pyrometer.

The preheating stage is preferably carried out by radiation, for example by means of infrared lamps or microwave radiation, or else by convection, for example by blowing of hot air.

The process according to the invention is generally continuous and employs in particular the forward progression of the glass substrate successively into a preheating device, for example an oven, then into a device for application of the solution, for example by means of at least one roll, and then into a heat treatment device, for example a tempering furnace. The preheating device is preferably located immediately upstream of the application device, so as to be able to control as best as possible the temperature of the face to be coated before the start of the application. A drying device is advantageously interposed between the application device and the heat treatment device.

Preferably, the drying device employs preheated air at the heat treatment device.

The material obtained according to the invention is characterized in particular by the fact that the antireflective coating is particularly homogeneous in thickness.

Another subject matter of the invention is thus a material, capable in particular of being obtained by the process according to the invention, which comprises a textured glass substrate coated, on at least one of its textured faces, with an antireflective coating of sol-gel type based on porous silica. Said textured face exhibits a relief composed of a succession of peaks and valleys, and the local thickness of the antireflective coating at the peaks is at least 60 nm, in particular 80 nm and even 100 nm, and the local thickness of the antireflective coating at the valleys is at most 700 nm, in particular 600 nm and even 500 nm.

Preferably, the value of the local thickness of the antireflective coating at said peaks is at least 40%, in particular 50% or 60%, of the value of the local thickness of the antireflective coating at said valleys. Observation by microscopy, in particular using a scanning electron microscope, carried out in particular on the edge face of the material, makes it possible to measure these local thicknesses.

As indicated above, the glass substrate can have just one textured face or two textured faces. At least one textured face is coated with the antireflective coating of sol-gel type. The other face of the substrate, whether it is or is not textured, may or may not be coated with an antireflective coating, of or not of sol-gel type. All the combinations of characteristics are possible in this instance.

The material preferably exhibits a light transmittance factor, within the meaning of Standard EN410, of at least 92%, in particular 93% and even 94%. When both faces of the substrate are coated with an antireflective coating, the light transmittance factor can even be at least 96%, in particular 97% or 98%.

The antireflective coating makes it possible, when it is deposited on a face of the substrate, to increase the light transmittance factor by least 1%, in particular 2% and even 3%. In this instance, this is an absolute and not relative increase.

The characteristics relating in particular to the substrate and to the antireflective coating presented above during the description of the process according to the invention also apply to the material according to the invention.

Another subject matter of the invention is a greenhouse, in particular an agricultural, horticultural or urban greenhouse, comprising at least one material according to the invention. The material is preferably incorporated in the roofing of the greenhouse. The textured face of the material which is coated with the antireflective coating can be turned toward the interior or exterior side of the greenhouse.

Other applications of the material according to the invention are also possible. The material according to the invention can, for example, be employed as front face of a photovoltaic cell.

The examples which follow nonlimitingly illustrate the invention.

Two glass substrates having a textured face were coated with a sol-gel antireflective coating in the way described in Application FR 2 908 406, using a completely aqueous solution containing TEOS as silica precursor and a pore-forming agent in the form of polymeric beads.

The two substrates, known as substrate A and substrate B, exhibit, in the uncoated state, the characteristics in terms of surface condition and of optical properties given in table 1 below. The roughness parameters Rz and RSm are defined according to Standard ISO 4287:1997, the haze according to Standard ISO 14782:1999 and the light transmittance factor (LT) according to Standard EN 410.

TABLE 1

| Substrate | Rz (µm) | RSm (µm) | Haze (%) | LT (%) |
|---|---|---|---|---|
| A | 72 | 1530 | 50 | 91 |
| B | 100 | 1800 | 55 | 91 |

In a comparative example, the glass substrates were not subjected to preheating before application of the solution. In an example according to the invention, the glass substrates were preheated using infrared lamps, so that the temperature of the substrate was 70° C. immediately before application of the solution. This temperature was measured using a pyrometer.

For each of the examples, the gain in light transmittance obtained is presented in table 2 below. This absolute gain, denoted ΔLT, is expressed in %.

TABLE 2

|  | A | B |
|---|---|---|
| ΔLT (%) - comparative | 1.3 | 0.9 |
| ΔLT (%) - invention | 1.8 | 1.4 |

It is thus seen that the preheating stage made it possible to improve the antireflective effectiveness of the coating, so that the material exhibits a greater light transmittance. The gain related to the preheating stage is of the order of 0.5% in absolute terms.

The invention claimed is:

1. A process for obtaining a material comprising a textured glass substrate coated, on at least one of its textured faces, with an antireflective coating of sol-gel type based on porous silica, said process comprising:

applying, to said at least one textured face of said substrate, a solution containing at least one silica precursor and at least one solid pore-forming agent, said at least one solid pore-forming agent being in form of hollow or solid beads in said solution, then performing a heat treatment for consolidating said antireflective coating, said process further comprising, before said applying, subjecting the glass substrate to a preheating stage, so that said at least one textured face intended to be coated with said antireflective coating has a temperature within a range extending from 30° C. to 100° C. immediately before said applying.

2. The process as claimed in claim 1, wherein the solution is aqueous.

3. The process as claimed in claim 1, wherein a light transmittance factor within the meaning of Standard EN 410 of the glass substrate is at least 90%.

4. The process as claimed in claim 3, wherein the light transmittance factor within the meaning of Standard EN 410 of the glass substrate is at least 91%.

5. The process as claimed in claim 1, wherein the solution is applied by coating by means of at least one roll.

6. The process as claimed in claim 1, wherein the silica precursor is a compound chosen from silicon alkoxides and halides.

7. The process as claimed in claim 1, wherein the at least one pore-forming agent is an organic agent.

8. The process as claimed in claim 7, wherein the at least one pore-forming agent comprises polymeric beads made of polymethyl methacrylate, methyl (meth)acrylate/(meth) acrylic acid copolymers, polycarbonates, polyesters or polystyrene.

9. The process as claimed in claim 1, wherein the preheating stage is carried out by radiation or by convection.

10. The process as claimed in claim 9, wherein preheating stage is carried out by means of infrared lamps or by blowing of hot air.

11. The process as claimed in claim 1, wherein the heat treatment is a tempering treatment of the glass.

12. The process as claimed in claim 1, further comprising, immediately after the applying and before the heat treatment, a drying stage.

13. The process as claimed in claim 1, wherein the antireflective coating exhibits a mean thickness within a range extending from 10 nm to 10 μm.

14. The process as claimed in claim 13, wherein the antireflective coating exhibits a mean thickness within a range extending from 20 nm to 1 μm.

15. The process as claimed in claim 1, wherein the temperature is within a range extending from 50° C. to 80° C.

16. The process as claimed in claim 1, wherein the glass substrate exhibits a haze of at least 20%.

17. The process as claimed in claim 1, wherein at least one textured face of the glass substrate intended to be coated with the antireflective coating exhibits a profile such that, within the meaning of Standard ISO 4287:1997:

the parameter Rz is within a range extending from 18 to 200 μm, and the parameter RSm is within a range extending from 500 to 2500 μm.

18. A process for obtaining a material comprising a textured glass substrate coated, on at least one of its textured faces, with an antireflective coating of sol-gel type based on porous silica, said process comprising:

applying, to said at least one textured face of said substrate, a solution containing at least one silica precursor and at least one pore-forming agent, then performing a heat treatment for consolidating said antireflective coating, said process further comprising, before said applying, subjecting the glass substrate to a preheating stage, so that said at least one textured face intended to be coated with said antireflective coating has a temperature within a range extending from 30° C. to 100° C. immediately before said applying, wherein at least one textured face of the glass substrate intended to be coated with the antireflective coating exhibits a profile such that, within the meaning of Standard ISO 4287: 1997:

the parameter Rz is within a range extending from 18 to 200 μm, and the parameter RSm is within a range extending from 500 to 2500 μm.

19. A process for obtaining a material comprising a textured glass substrate coated, on at least one of its textured faces, with an antireflective coating of sol-gel type based on porous silica, said process comprising:

applying, to said at least one textured face of said substrate, a solution containing at least one silica precursor and at least one pore-forming agent, then performing a heat treatment for consolidating said antireflective coating, said process further comprising, before said applying, subjecting the glass substrate to a preheating stage, so that said at least one textured face intended to be coated with said antireflective coating has a temperature within a range extending from 30° C. to 100° C. immediately before said applying, wherein the glass substrate exhibits a haze of at least 20%.

20. The process as claimed in claim 19, wherein the glass substrate exhibits a haze of at least 50%.

* * * * *